(12) United States Patent
Kongs et al.

(10) Patent No.: US 10,880,085 B1
(45) Date of Patent: Dec. 29, 2020

(54) DEVICE, SYSTEM, AND METHOD TO FACILITATE SECURE DATA TRANSMISSION, STORAGE AND KEY MANAGEMENT

(71) Applicant: The University of Tulsa, Tulsa, OK (US)

(72) Inventors: Andrew Kongs, Tulsa, OK (US); Gavin Bauer, Tulsa, OK (US); Kyle Cook, Bixby, OK (US)

(73) Assignee: The University of Tulsa, Tulsa, OK (US)

( * ) Notice: Subject to any disclaimer, the term of this patent is extended or adjusted under 35 U.S.C. 154(b) by 170 days.

(21) Appl. No.: 16/052,804

(22) Filed: Aug. 2, 2018

Related U.S. Application Data

(60) Provisional application No. 62/540,608, filed on Aug. 3, 2017.

(51) Int. Cl.
  *H04L 9/12* (2006.01)
  *H04L 29/06* (2006.01)
  *H04L 9/32* (2006.01)
  *H04L 9/08* (2006.01)

(52) U.S. Cl.
  CPC ............. *H04L 9/12* (2013.01); *H04L 9/0819* (2013.01); *H04L 9/3278* (2013.01); *H04L 63/0435* (2013.01)

(58) Field of Classification Search
  CPC ..................................................... H04L 9/3278
  See application file for complete search history.

(56) References Cited

U.S. PATENT DOCUMENTS

| | | | | |
|---|---|---|---|---|
| 9,197,422 | B2* | 11/2015 | Irwin | H04L 9/3278 |
| 9,366,718 | B2* | 6/2016 | Shen-Orr | H01L 22/14 |
| 9,876,647 | B2* | 1/2018 | Kim | H04L 9/3278 |
| 2018/0123808 | A1* | 5/2018 | Hung | H04L 9/3278 |
| 2018/0191353 | A1* | 7/2018 | Su | H01L 23/576 |
| 2019/0377024 | A1* | 12/2019 | Zortman | G01R 31/2851 |

* cited by examiner

*Primary Examiner* — Kim Huynh
*Assistant Examiner* — Eric Chang
(74) *Attorney, Agent, or Firm* — Head, Johnson, Kachigian & Wilkinson, PC

(57) ABSTRACT

A method for creating devices facilitating secure data transmission, storage and key management. At least two devices are each comprised of at least part of a physically unclonable function unit originally shared by the at least two devices on a single, monolithic original integrated circuit. The process includes physically segmenting the shared physically unclonable function unit between the at least two devices. The at least two devices which share the single, monolithic integrated circuit are physically separated into individual device units.

6 Claims, 13 Drawing Sheets

Process Overview

Figure 5
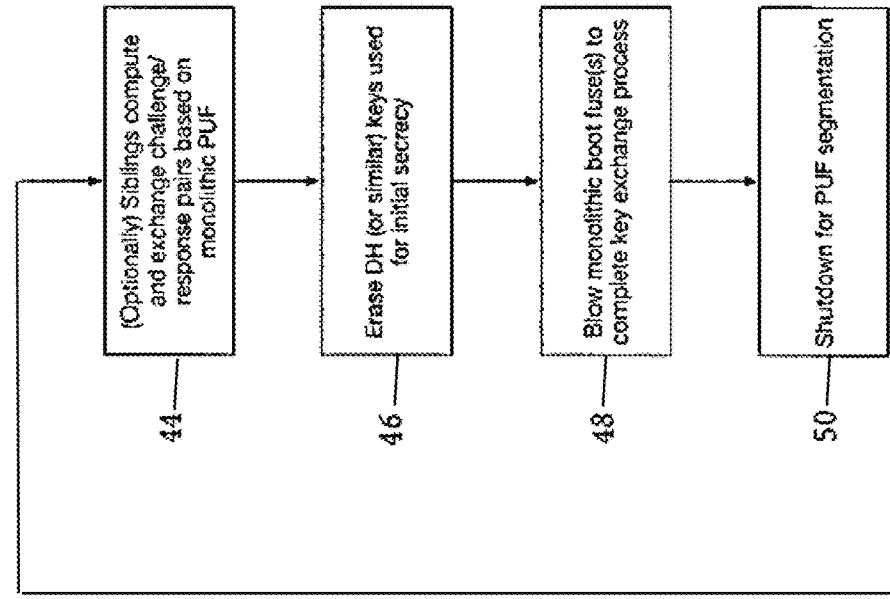
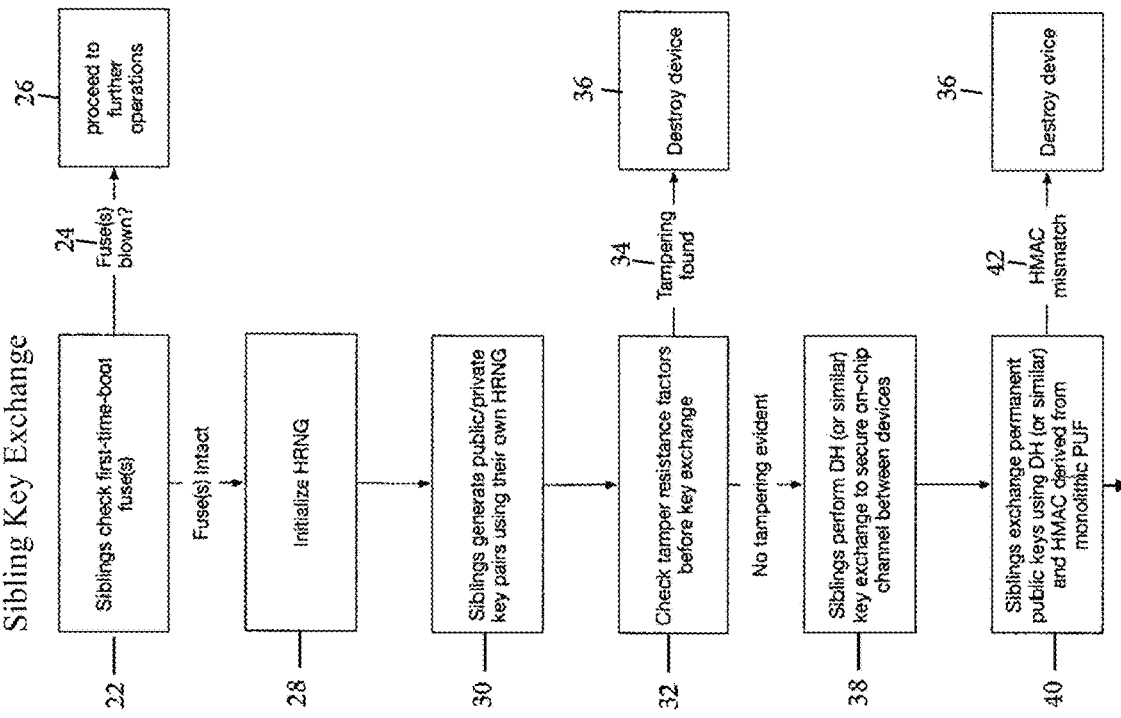

US 10,880,085 B1

DEVICE, SYSTEM, AND METHOD TO FACILITATE SECURE DATA TRANSMISSION, STORAGE AND KEY MANAGEMENT

CROSS REFERENCE

The present invention is based on and claims priority to U.S. Provisional Patent Application Ser. No. 62/540,608, filed Aug. 3, 2017, which is incorporated herein in its entirety by reference.

BACKGROUND OF THE INVENTION

Field of the Invention

The present invention is directed to a system and to integrated circuit devices that permit secure transmission of data across a network. The devices originally share a physically unclonable function unit and are created from and on a monolithic single integrated chip. The system, which utilizes the devices, provides security enhancements for computer users by generating secure keys and storing those keys.

Description of the Related Art

By connecting to a network, a computer connects to other computer devices and machinery around the globe. Alternatively, without access to a network, computers lose much of their modern usefulness. Networks allow computers to share data with each other. Unfortunately, by connecting to a network, a computer becomes vulnerable to attackers, malicious users, negligent employees, or misconfigured security systems. This vulnerability can leave data at risk of being exposed through network-based attacks.

The personal, medical, financial, and private information that is stored and accessed through computer networks needs to be kept secure and protected from attacks. When user information is misappropriated, it can be used to commit fraud, extortion, harassment, or discrimination. As more data is generated, collected, stored digitally, and ultimately leaked, it becomes easy to erode personal privacy in irreversible ways.

A simple solution to this problem is to avoid transmitting data over an unsecured network, such as the internet. However, as mentioned above, by not connecting to a network, the usefulness of a computer is severely limited. In response, the fields of cryptography and cybersecurity have developed methods that allow computers to securely transmit data over unsecured networks. Cybersecurity is concerned with ensuring that the data transmitted, accessed, and stored on computer networks remains secure and confidential.

Cryptography is the science of coding and decoding messages so as to keep these messages secure. Coding takes place using a key that ideally is known only by the sender and intended recipient of the message. Those without access to the key are unable to decrypt the data.

Different aspects of cryptography include:

Identity

In terms of Computer Security, identification is the act of an entity stating who they are, their identity, without verification. This is important, because certain situations may dictate when verification of the identity is necessary. To verify an entity's claim of an identity, one must perform authentication to verify the identity.

Authentication

There are many situations in which one must prove they are who they say they are. Using techniques such as Asymmetric Key Cryptography enable the ability to prove identity by means of public and private keys. For example, if Alice wants to prove to Bob that she is indeed Alice, she can encrypt a message with her private key and send it to Bob. Bob then decrypts the message with Alice's public key. If the decryption is successful, the message must have come from Alice, as Alice is the only person who holds her private key.

Confidentiality

Confidentiality, or privacy, is concerned with preventing unauthorized parties from accessing information. The main concern is keeping some information a secret, whether in transit or in permanent storage. Currently, this is usually maintained by means of a secret key. Anyone who holds access to this key is authorized to access the data.

Integrity

Integrity ensures that the data has not been tampered with. For example, Alice sends Bob a message over the internet. Alice does not care if non-authenticated parties can see the message, but she wants to ensure that the message is never changed. Cryptographic hashing methods can be used to ensure that after a message has been transferred, it has not been changed in any manner.

Various cryptographic methods can be used to: authenticate the identity of a computer, ensure that the transmitted data remains private, and ensure that the data has not been tampered with. By addressing these concerns, one can more securely transmit data across a network from computer to computer. Current methods of securely transmitting data across networks include using Virtual Private Networks (VPNs), encrypting email with PGP, and accessing secure webpages using TLS/SSL.

Crypcap™ is one example of current technology, as set forth in pending U.S. patent application Ser. No. 14/734,788, describing a system, method, and network security monitoring, information sharing, and collective intelligence, owned by the Applicant herein.

The use of public-private keys is another way to securely transmit data across a network. This process involves encrypting data with a private key and sending that data across a network to another computer. The receiving computer then decrypts the transmitted data with a public key. Encryption can either be done using an asymmetric key pair, in which encryption is performed with one key and decryption is performed with another, or it can be performed symmetrically, in which both encryption and decryption are done with the same key.

Furthermore, Virtual Private Networks (VPNs) can also be used to ensure a secure channel for transmitting data across a network. VPNs integrate remote systems into a single logical network. A form of authentication is required to connect to the network. A common example would be allowing employees to connect to their office resources from any internet access point.

Finally, Derived Unique Key Per Transaction (DUKPT) is a key management algorithm in which a fixed base key derives a series of unique keys. Thus, if a derived key is ever compromised, the original key and the other derived keys are still protected. DUKPT consists of several important steps. First, key generation is performed in protected hardware modules and keys are never transmitted out of the hardware. Second, once the initial key is set, it is used to derive an array of future keys. This process allows an encrypting device to be in sync with a decrypting device, so that the unique keys never need to be transmitted between devices. Rather, a mathematically unrelated key serial number is used to convey which key belongs to which encrypted transaction.

For additional protection, keys should be generated, stored, and handled in hardware. A primary reason for a hardware solution is the pursuit of a tamper-resistant implementation to protect encryption keys and enhance the security provided by the solution. By keeping the keys entirely within a hardware component, there is no need to copy any keys to the operating system or to another device. This process greatly reduces the risk of exposure of the keys. By making the hardware tamper-resistant, it is possible to reduce the risk of key extraction from the module even further.

Tamper-resistant security modules (TRSMs) are specially designed hardware which are often used for dedicated encryption devices in high security environments. If a TRSM becomes aware of an attempt to copy or modify data on the TRSM, the TRSM destroys any keys stored on it. More importantly, if information is stolen from one TRSM, an attempt to copy it on to another TRSM for decryption of the captured data will result in it being irreversibly altered. Once altered, it is useless.

A Physically Unclonable Function (PUF) is a function that is based off of the physical characteristics of an object. The three key attributes of a PUF are physical characteristics that are inherent, instance-specific, and unclonable. They are extremely useful because even if someone has physical access to the silicon semiconductor, they are still unable to recreate it due to the underlying microstructure.

PUFs are evaluated by giving the integrated circuit a challenge and by monitoring its response. For example, two similarly manufactured integrated circuits will not produce identical responses to the same stimulus These differences are due to the microscopic differences in the physical structure of the circuit, similar to a fingerprint.

Despite all the recent advances in cybersecurity, there remains a glaring weakness. The foregoing technologies rely heavily on the use of keys to encrypt and decrypt data. Thus, a system's security is only as good as the key management protocols in place. Managing keys requires trust, and when a situation arises in which a key must be changed, all users with that key must be given the new key securely. Therefore, if someone misappropriates the keys, either intentionally or accidentally, the security of the entire system is compromised. Furthermore, sharing and copying the cryptographic keys puts the keys at risk. The confidentiality of the encrypted data is weakened by these exposures.

A second weakness not addressed by current technology is called non-forward secrecy. If a long-term key is compromised, all past data encrypted with this key becomes vulnerable. Proper use of encryption and key management technologies allow forward secrecy of keys during transactions.

Finally, current technology cannot address the problem of access of granular control (who has control and access to the network and encryption keys). For example, once a key is disclosed, all uses of that key must be changed if that key is ever misappropriated.

Based on the foregoing, it is desirable to design a system which uses devices that are capable of securely transmitting data across unsecure networks using a robust key management solution.

It is further desirable for such devices to utilize both tamper-resistant security modules and physically unclonable functions in order to store and generate unreproducible keys.

It is further desirable for such a device to be able to have a unique and unrepeatable identity that other devices can use to authenticate its identity and verify the data transmitted across a network is untampered.

It is further desirable for such a device to be easily created and implemented in computer networks.

SUMMARY OF THE INVENTION

As the complexity of the most critical networks and the threats against them continue to grow, so does the need to create a system to securely transmit data across those networks. The present invention is directed to a system for securely transmitting data across a network using paired devices that originally share a physically unclonable function unit.

In a first aspect, the present invention relates to a method or process for creating a plurality of devices that facilitate secure data transmission, storage and key management, comprising at least two devices, including a first and a second device. The at least two devices are each comprised of at least part of a physically unclonable function unit originally shared by the at least two devices on a single, monolithic original integrated circuit.

The at least two devices are first initialized; the first device exchanges at least one key with the second device; the shared physically unclonable function unit is physically segmented between at least two of the devices; each of the segmented devices are initialized a second time; and the devices, which share the single, monolithic integrated circuit, are physically separated into individual device units.

In a second aspect, the present invention relates to a system of communicating between two computers over a network. The system comprises at least two devices, including a first and a second device, where each of the devices are comprised of at least part of a physically unclonable function unit that was originally shared by the devices on a single, monolithic original integrated circuit. The first device encrypts data located on a first computer using keys contained within the physically unclonable function unit; the first device transmits the data across a network to the second device; the second device, using part of the physically unclonable function unit, verifies the source of the transmitted data; the second device accepts the transmitted data from the network; the second device decrypts the data using the physically unclonable function unit; and the second device transmits the data to a second local computer.

In a third aspect, the present invention relates to a method or process of resynchronizing at least two devices, where each of the devices are comprised of at least part of a physically unclonable function unit that was originally shared by the devices on a single, original integrated circuit. The devices are connected together to communicate with each other. Keys are exchanged between the devices. The identity of the devices is verified and data is exchanged between the devices.

BRIEF DESCRIPTION OF THE DRAWINGS

FIG. 5 illustrates a sequential flow chart of how the plurality of devices exchange keys while they are still connected on a single integrated circuit;

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 1:
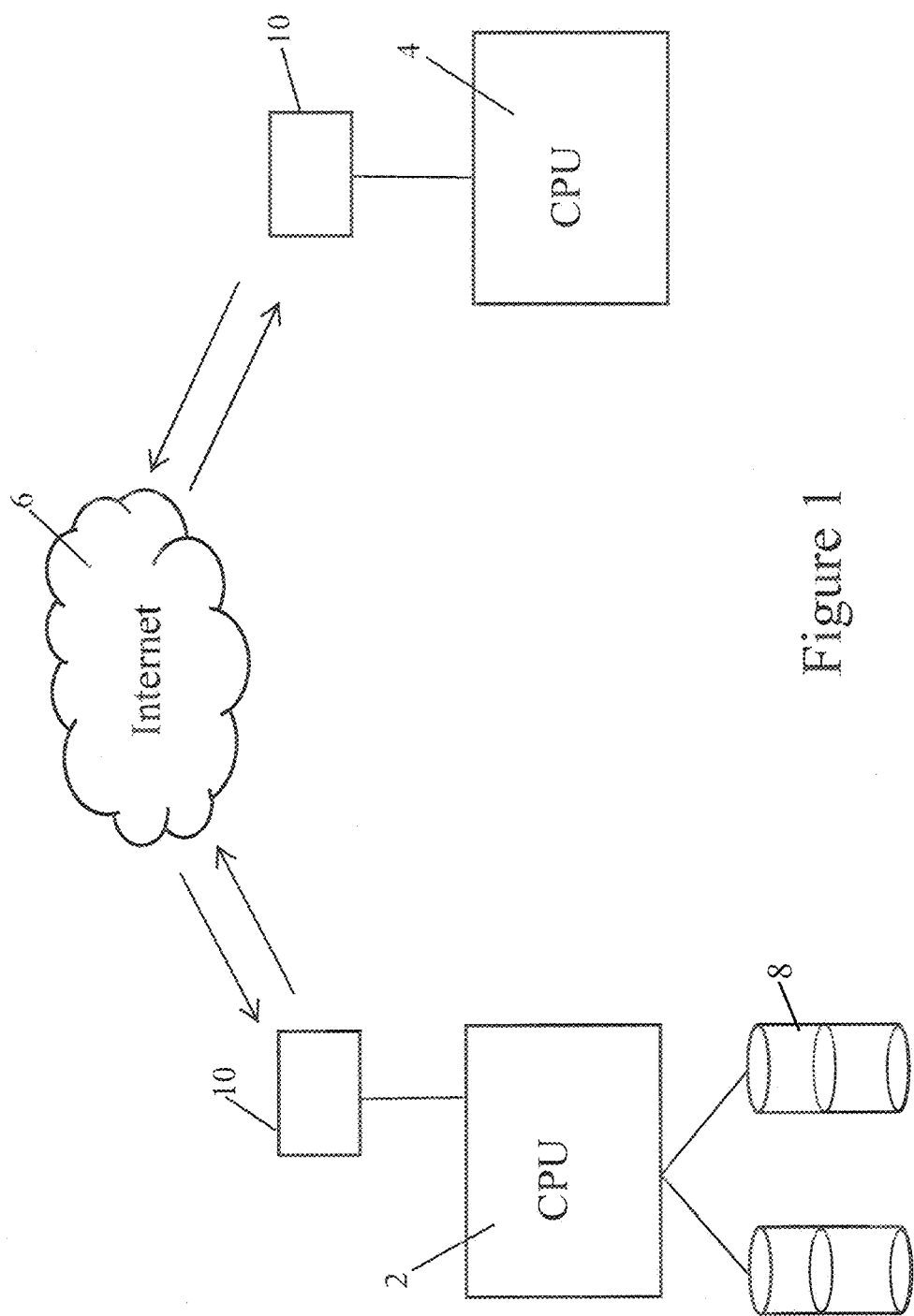
FIG. 1 illustrates a simple diagram of computers in communication with one another across a network utilizing the present invention.

Referring to the drawings in detail, the present invention relates to a system having a plurality of tamper-resistant security module integrated circuit devices 10 capable of securely transmitting data across a network. The invention includes a system of communicating between two computers. FIG. 1 illustrates a simple diagram showing a first computer or central processing unit 2 in communication with a second computer or central processing unit 4 through the devices 10 and through a network, such as the internet 6.

Figure 2:
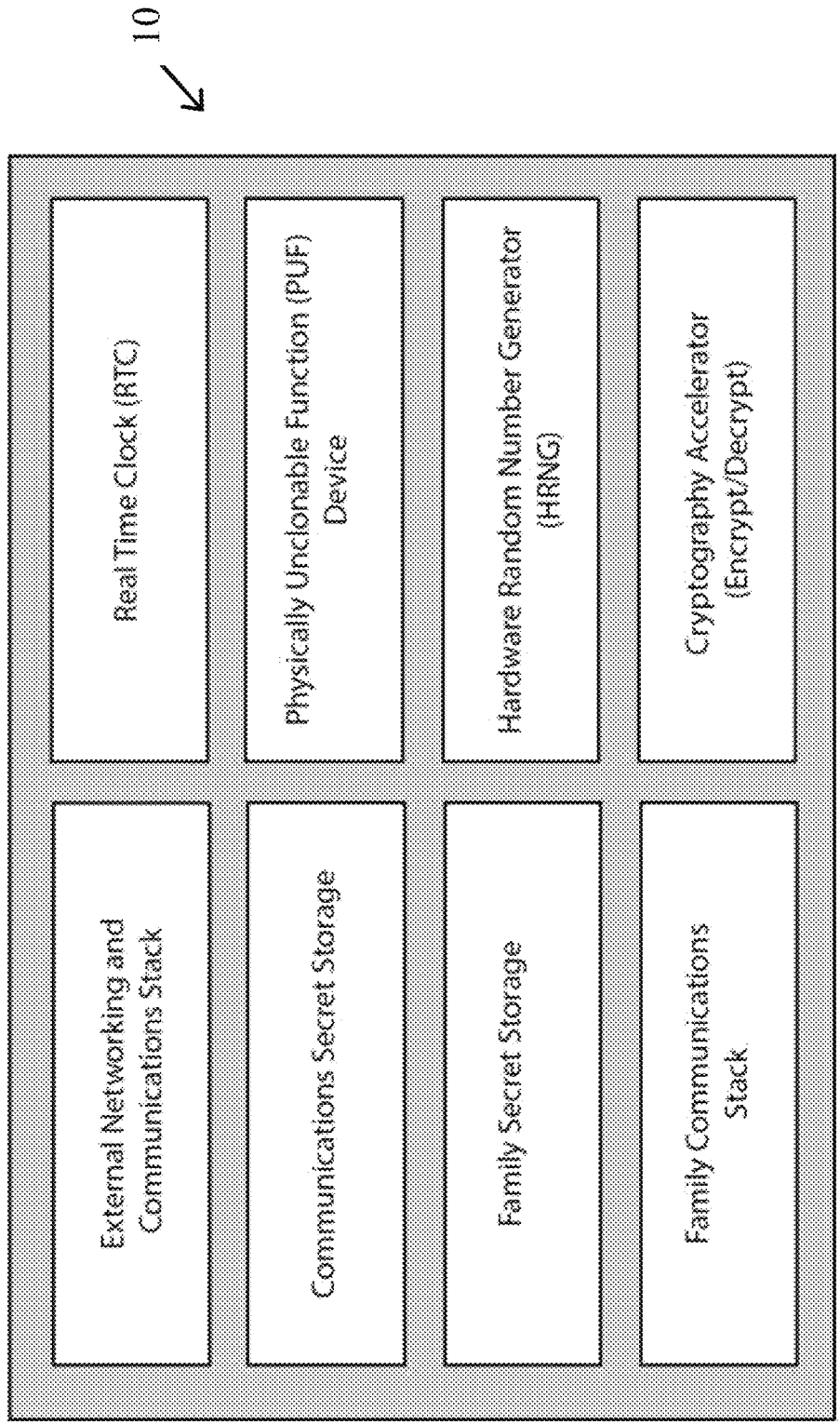
FIG. 2 illustrates a simple diagram of possible components that can be present on an integrated circuit device to facilitate secure data transmission, storage and key management in accordance with the present invention.

FIG. 2 is a simplified diagram showing that each tamper-resistant security module integrated circuit device 10 is composed of a set of internal components or blocks each with specific tasks. FIG. 2 illustrates possible components on each device 10, which may include an external networking and communications stack; a communications storage; a family key storage; a family communications stack; a real-time clock; a physically unclonable function; a hardware random number generator; and a cryptography accelerator.

An external network and communication stack is provided for communication with existing network infrastructure. A real-time clock is provided for maintaining an accurate record of the current time as well as a time of each transaction or action. A communications secrets storage is provided for storing information necessary for secure communication between general devices. A physically unclonable function is provided for one-time random number generation. Family secrets storage is provided for storing information necessary for secure communication between family devices. A hardware random number generator is provided for continuous generation of random numbers. A family communications stack is provided for secure communication between family member devices. A cryptography accelerator is provided for fast cryptographic operations. These blocks work together to send data securely over a network and, optionally, record the data sent for archival purposes. It will be appreciated that other components are possible within the spirit and scope of the invention.

Figure 4:
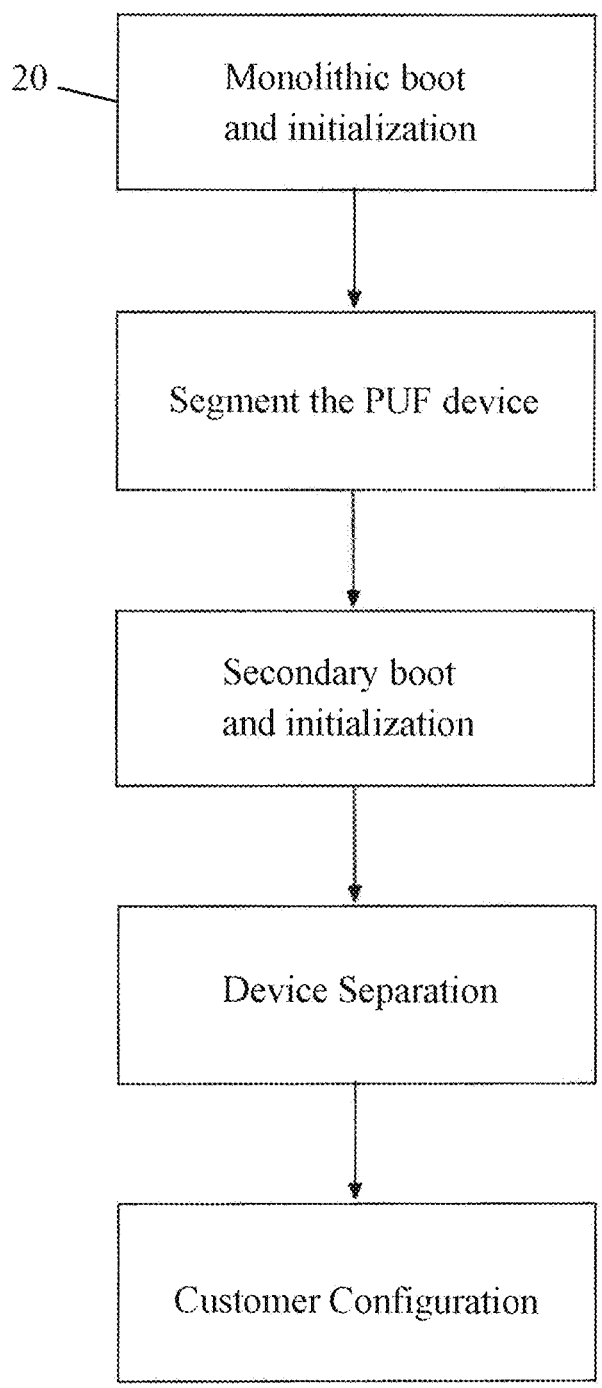
FIG. 4 illustrates a sequential process flow chart of how the single integrated circuit shown in FIG. 3 is first initialized.

FIGS. 4 through 8 illustrate the sequential process of creating such devices 10. FIG. 4 illustrates the overall process. As seen at box 20, the monolithic integrated circuit is booted and initialized.

Figure 3:
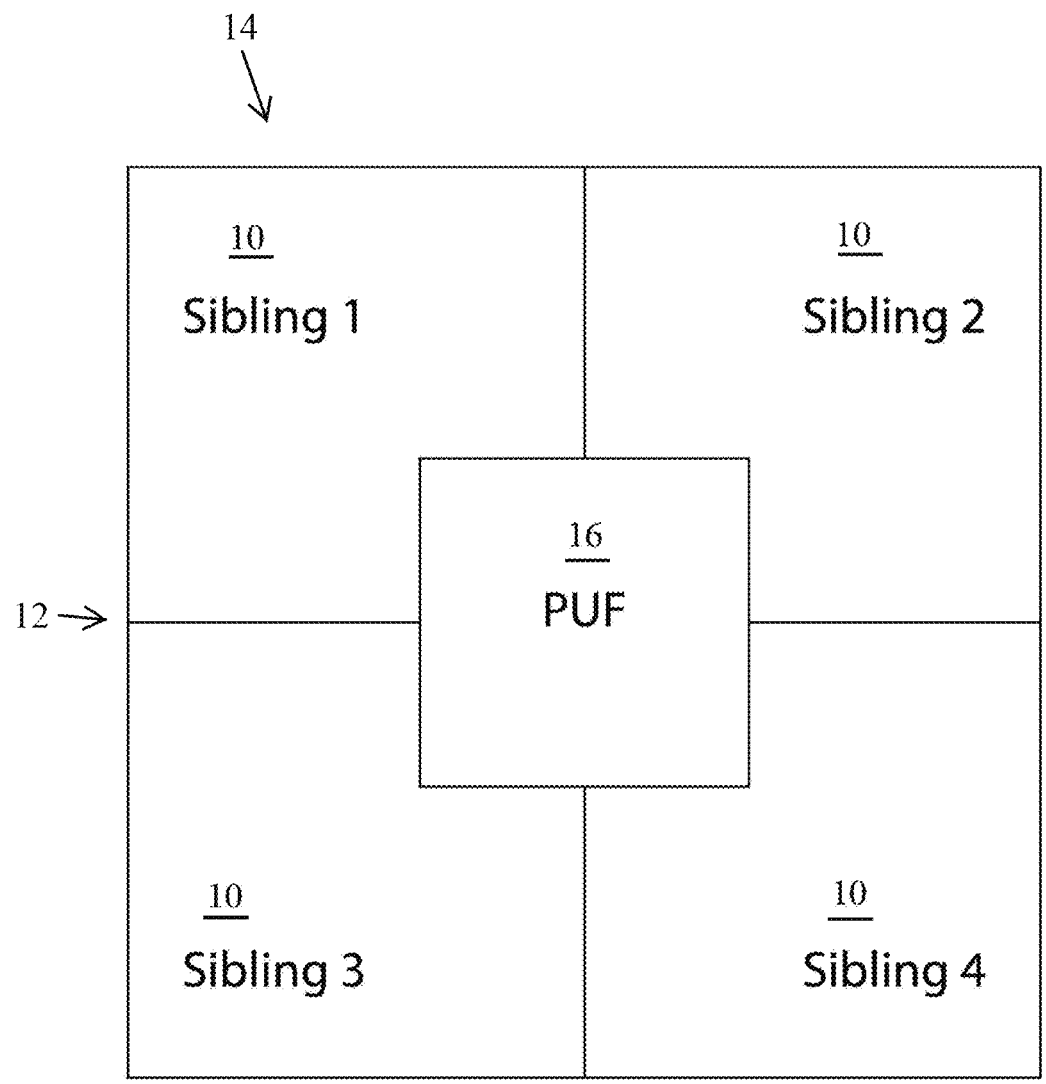
FIG. 3 illustrates a diagram of a plurality of devices contained on a single integrated circuit where the devices share a common physically unclonable function unit.

FIG. 3 is a diagram of a plurality of devices 10 contained on a single integrated circuit. As seen in the diagram in FIG. 3, each device 10 is originally contained in and created from a single, integrated circuit 12, along with several "sibling" devices 10. All the devices 10 on a single monolithic integrated circuit 12 can be described as a family 14. To be considered part of the same family 14, the devices 10 must share access to an apparatus built within the integrated circuit 12, called a "Physically Unclonable Function" (PUF) device 16.

A PUF device 16 is capable of generating random numbers or data in an unpredictable but repeatable fashion. Accordingly, the same input to the PUF device 16 will always produce a single output, but a given output for another number cannot be predicted based on previous outputs. This behavior is due to the microstructure and physical construction techniques of each PUF unit. The PUF device 16 built within the family 14 is constructed in such a fashion that it could be segmented into pieces 18 (not seen in FIG. 3). However, each segmented piece 18 would still retain the ability to function as an independent PUF device.

This PUF device 16 can be used to verify membership to the family 14 when all of the devices 10 are connected together. It can also generate challenge-response keys for later use. As part of the production process for the family 14, after an initial exchange of family keys, they are physically divided, as seen in the diagram in FIG. 6. This division occurs in stages. It begins by physically dividing the PUF into pieces 18 so each sibling device 10 has a small part of the former monolithic PUF 16. Since PUFs are so dependent on their physical structure, dividing it into pieces effectively destroys the original PUF. Once the original PUF 16 is destroyed, only the devices 10 that were created with it have access to any of the challenge-response data derived from the original PUF 16. This data can never be regenerated because the original PUF device 16 was destroyed in the process.

A first initialization of the devices 10 is illustrated in the sequential flow chart in FIG. 5. Upon first initialization, each device 10 checks 22 its fuses 24 to determine whether it has previously been initialized. If the fuses 24 are blown, the device 10 will proceed to further initialization operations and/or attempt to startup for regular operation, as shown at box 26. If the fuses 24 for the first boot process have not yet been blown, the device 10 will proceed to initialize its Hardware Random Number Generator (HRNG), as shown at box 28. Using the HRNG 28, each device 10 in the family 14 will generate a public-private key pair, as shown at box 30, for use in an asymmetric cryptography algorithm. Each device 10 will check tamper-evident factors, as shown at box 32, built into the integrated circuit 12. If any tampering 34 is found in the device 10 at this stage, the device 10 will destroy itself, as shown at box 36. If no tampering is evident, the sibling devices 10 perform a Diffee-Hellman (or similar) key exchange, as shown at box 38, that secures an on-device channel between each of the devices 10. Using the monolithic PUF 16, the devices 10 exchange a Hash-based Message Authentication Code (HMAC), as shown at box 40, over the secured channel to ensure they are communicating with a member of the same family 14 (devices originally connected to the original monolithic PUF). Should any mismatch 42 occur in the HMAC 40 process, the device 10 will destroy itself at this stage, as shown at box 36. Using the HMAC 40 for verification, the sibling devices 10 exchange public keys for later communication and then destroy the exchanged Diffee-Hellman (or similar) key 38. Next, the siblings optionally compute and store a set of hashes to be used as challenge-response pairs, as shown at box 44, using the monolithic PUF device 16. The devices then erase 46 the Diffee-Hellman (or similar) keys 38. The devices 10 then blow 48 the boot fuses 24, indicating that the initial boot and key exchange process has been completed. The devices 10 then shutdown, as shown at box 50, for the next phase of the manufacturing and initialization process.

Figure 6:
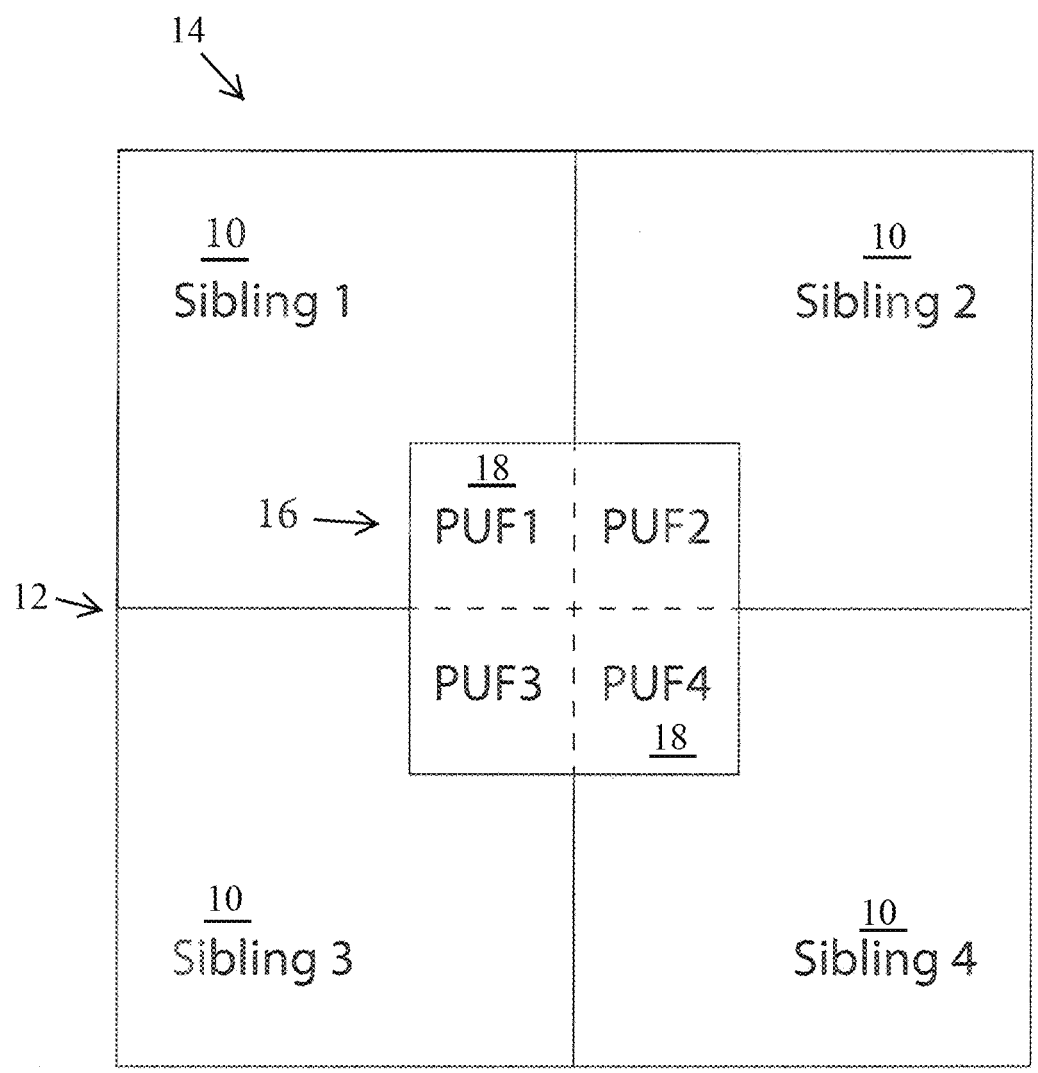
FIG. 6 illustrates a diagram of the plurality of devices showing how the original physically unclonable function unit is physically segmented among the devices.

FIG. 6 illustrates a diagram of the plurality of devices 10 showing how the PUF device is segmented. As shown in FIG. 6, the integrated circuit 12 containing the family 14 of devices 10 is mechanically cut so that the PUF device 16 is physically segmented or split into pieces 18 for each device 10. This process destroys the monolithic PUF device 16 and provides each device 10 with a new, unique but smaller PUF device 18.

Figure 7:
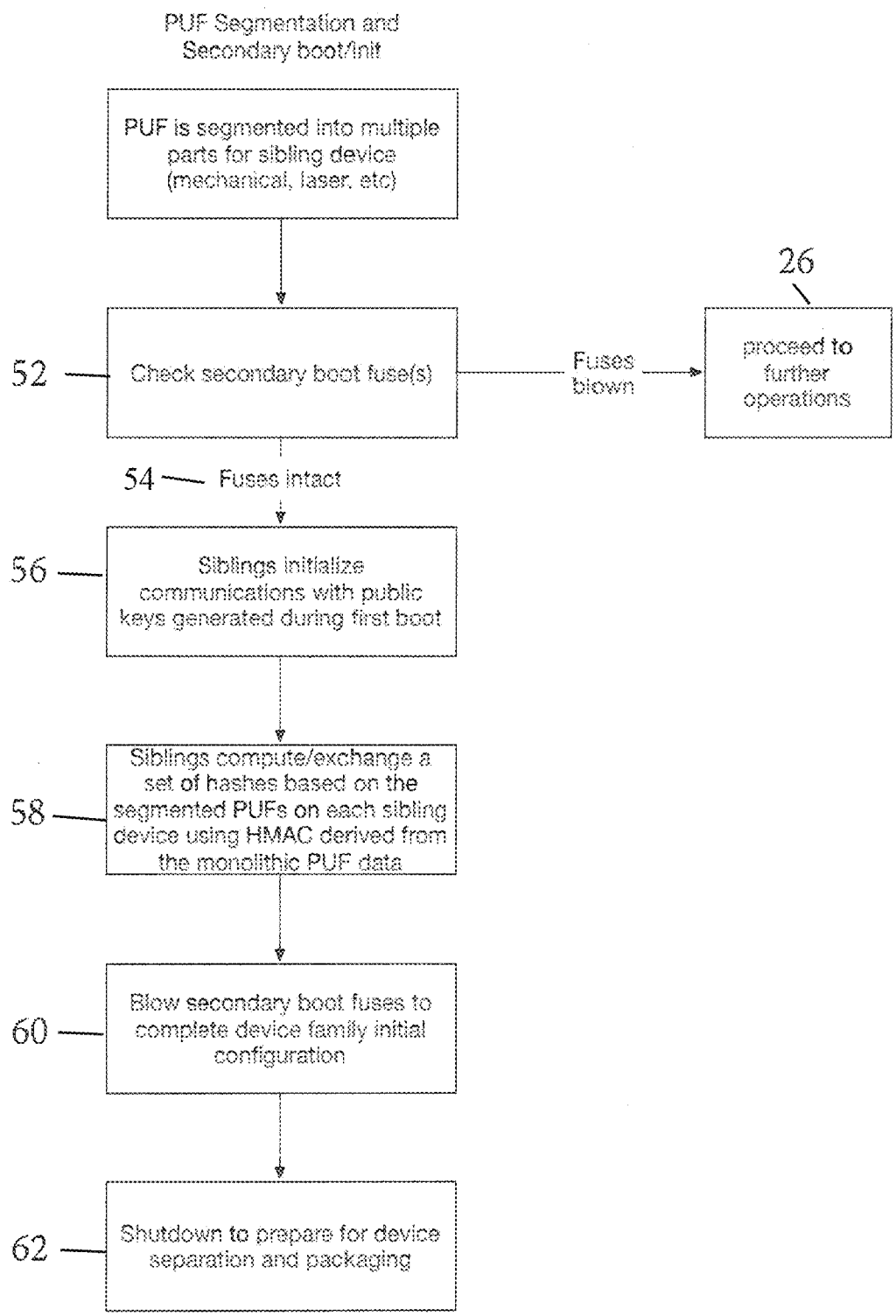
FIG. 7 illustrates a sequential flow chart of a secondary initialization process that occurs after the physically unclonable function unit is divided among the devices.

Once the monolithic PUF device 16 is physically separated, the sibling devices 10 are powered on to continue the initialization process. FIG. 7 illustrates this second sequential process. The devices 10 each check their onboard secondary fuses, as seen at box 52. If the fuses 52 for the secondary boot process are intact 54, each device 10 will continue with initialization or proceed to normal operations, as shown at box 26. Each device 10 will begin to communicate with the other devices using the permanent public keys 38 exchanged during the first initialization process, as shown at box 56. These keys 38 are known only to the devices 10 because they were originally created with the original PUF device 16. Each device 10 then computes a series or set of hashes, as shown at box 58, based on each devices' new unique PUF 18 that was created when the monolithic PUF 16 was mechanically divided. The devices 10 then exchange and store these hashes 58 with the devices in their family 14 for future use as challenge-response pairs. Once the secondary challenge-response hashes 58 have been exchanged, as shown at box 60, the devices 10 blow their fuses 52 for the secondary boot process to indicate that initial configuration has been completed. The devices then shutdown and prepare to be mechanically separated from the single, integrated circuit 12, as shown at box 62.

Figure 8:
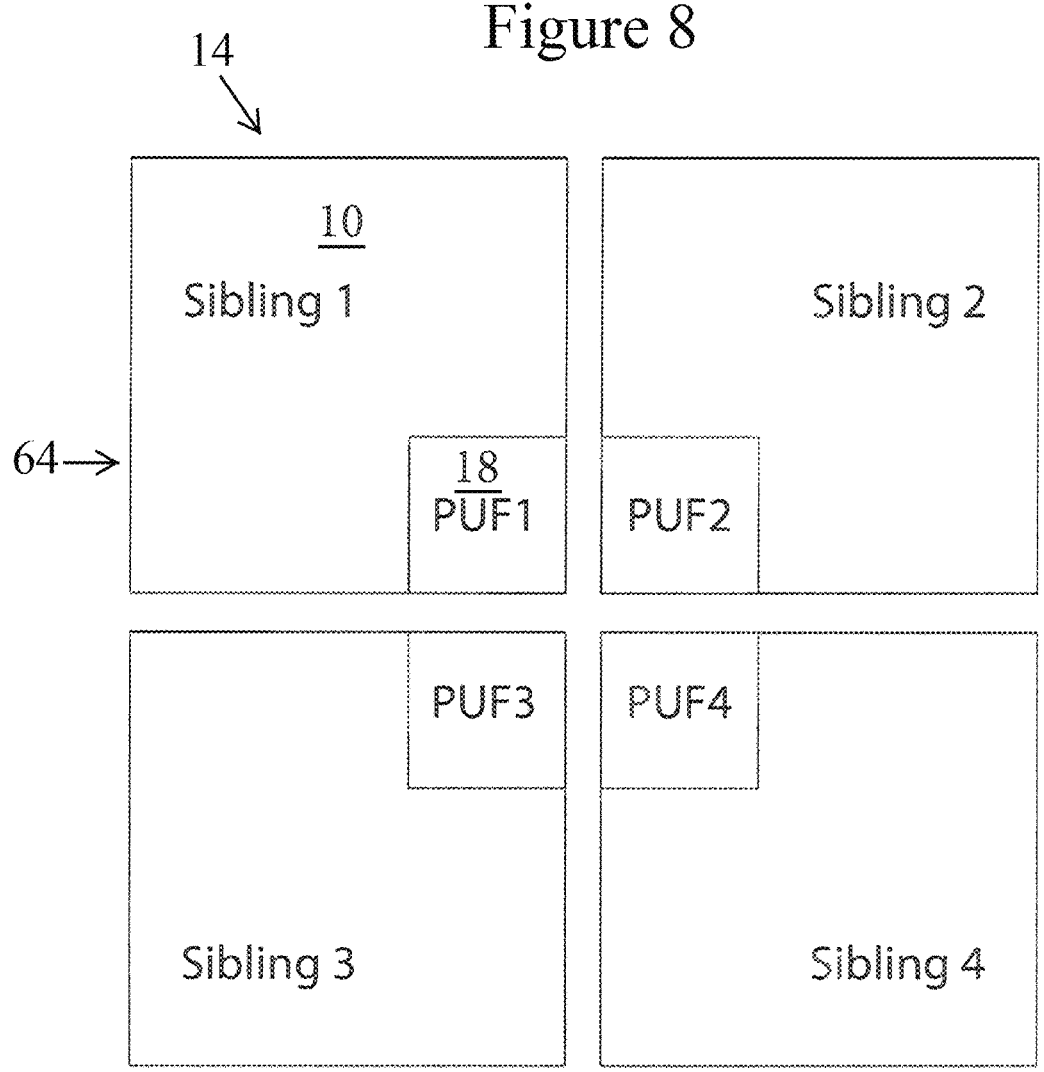
FIG. 8 illustrates a diagram of the plurality of devices segmented as the individual devices and how each contains a part of the physically unclonable function unit.

FIG. 8 illustrates a diagram of the plurality of sibling devices 10. As seen in FIG. 8, the family 14 of devices 10 is physically separated into individual integrated circuits 64.

Figure 9:
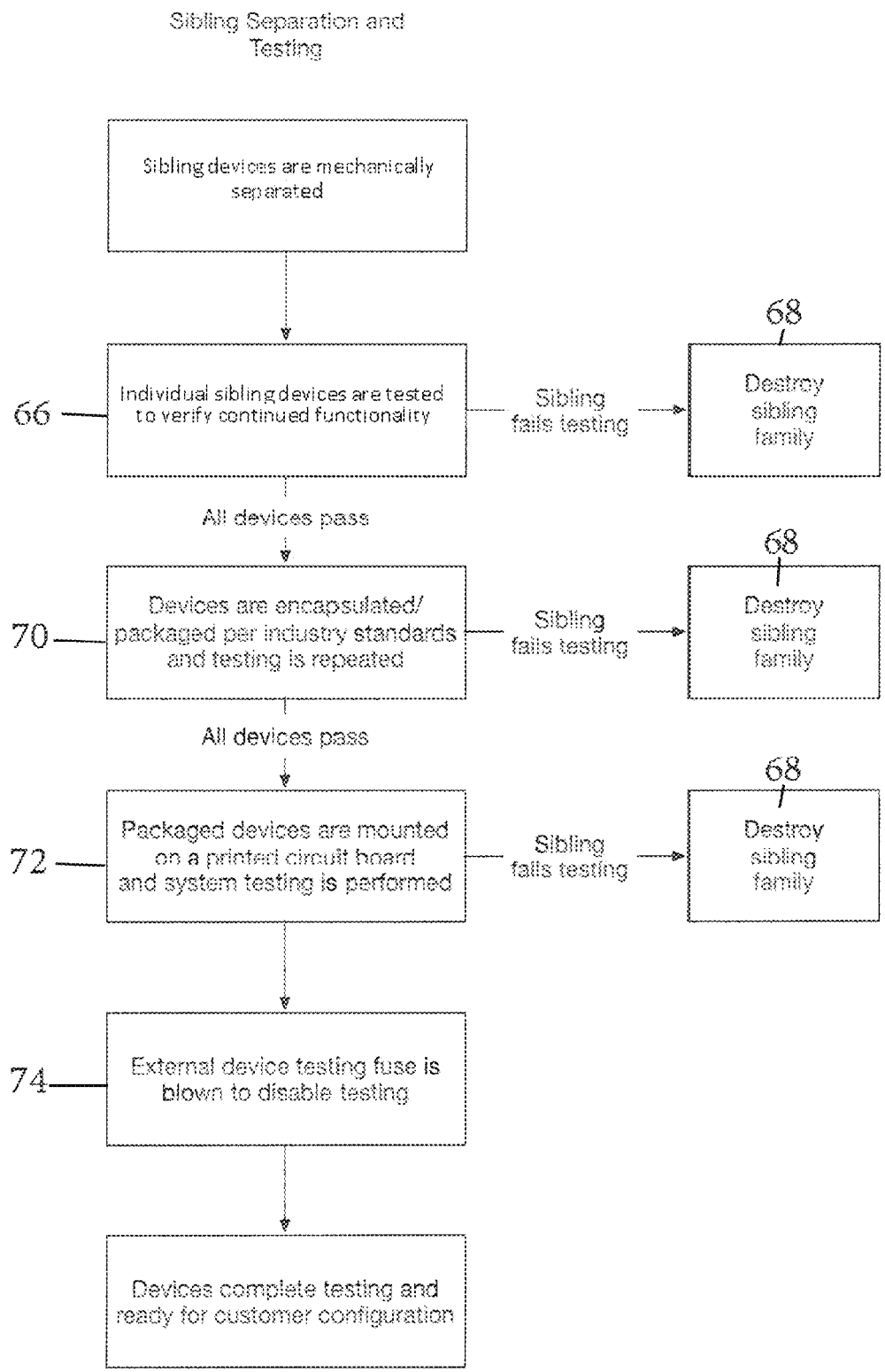
FIG. 9 illustrates a sequential flow chart of how the device that has been mechanically separated is tested.

FIG. 9 illustrates a sequential flow chart of the process of mechanically separating and testing the individual devices 10 to verify that they are still functioning, as shown at box 66. The family 14 is tested to determine if it is functional and, if too many of the devices 10 are deemed nonfunctioning, the whole family 14 is destroyed, as shown at box 68. The devices 10 are then encapsulated or packaged according to industry standards, as shown at box 70. The devices 10 are mounted on final circuit boards, as seen at box 72, and tested a final time. If too many of the printed circuit board assemblies 72 fail and cannot be reworked, the whole family 14 will be destroyed, as shown at box 68. Once the final circuit board assembly 72 is finished testing, the devices have their external testing fuses blown to disable testing, as shown at box 74. The individual devices 10 are then ready for customer configuration.

Figure 10:
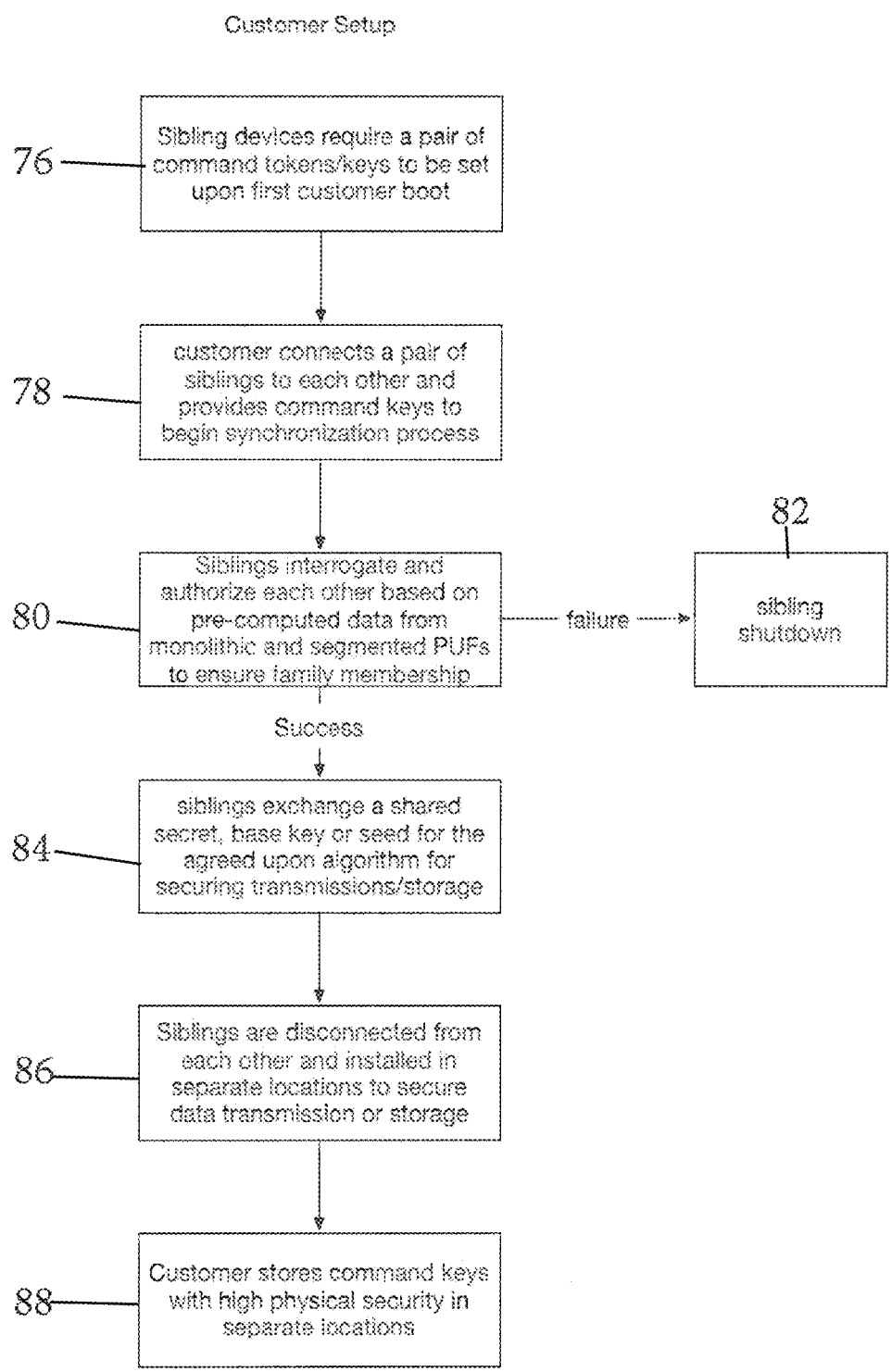
FIG. 10 illustrates a sequential flow chart of how the device is configured for customer use.

FIG. 10 is a sequential flow chart illustrating how a device 10 would be configured for customer use. Once the devices 10 are ready to be configured for regular operations, each device 10 requires a pair of command tokens or keys to be set, as shown at box 76. Once the command tokens 76 are set, a pair of the devices 10 can be connected together, as shown at box 78. The connection may be in a variety of ways, such as shown in FIG. 1.

The devices 10 interrogate and authorize each other, as shown at box 80, based upon pre-computed data from the monolithic PUF 16. Using the command tokens, the devices 10 can be commanded to generate and share communications with each other. The devices 10 interrogate each other using the family keys that were generated during the device creation process. This interrogation, as shown at box 80, uses the challenge-response pairs generated from the PUF data stored during the creation of the devices 10. If the devices 10 fail to authorize each other, they shutdown, as shown at box 82. However, if the devices 10 successfully authenticate each other, the pair of connected devices 10 then generate and exchange keys, as shown at box 84. The devices 10 are then disconnected from each other and can be installed for normal operation at remote locations 86. The connection may be in a variety of ways, such as shown in FIG. 1. The user would store the command keys in a safe location, as shown at box 88.

Figure 11:
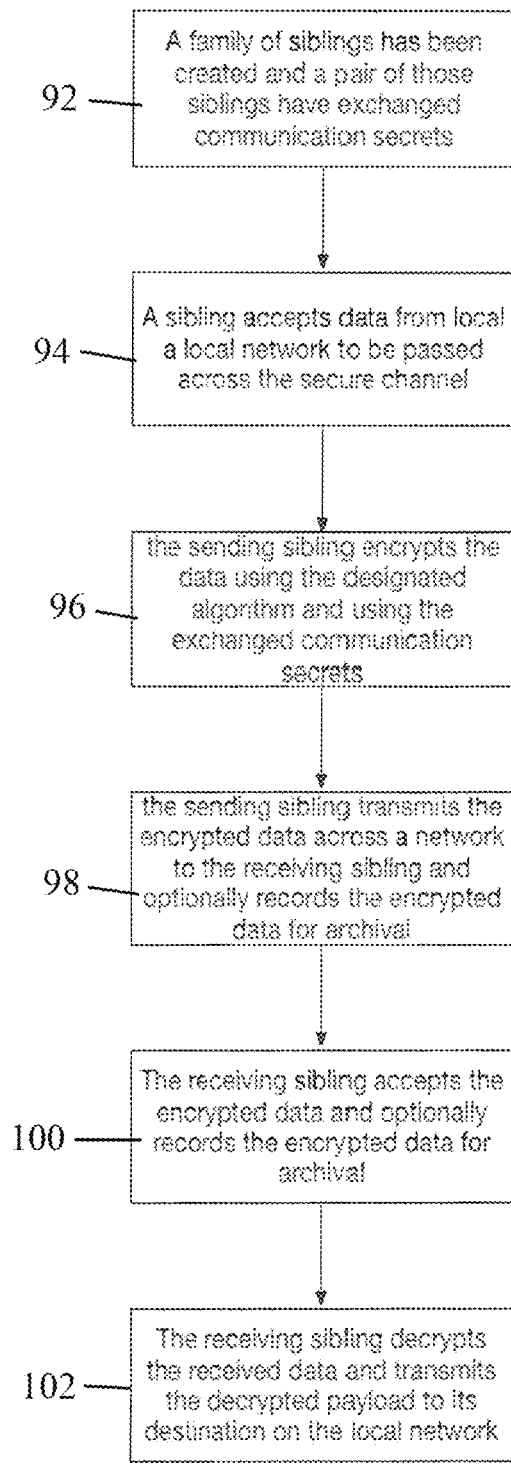
FIG. 11 illustrates a sequential flow chart of normal operating procedures for a system which is composed of the devices that were originally contained on a single, original integrated circuit.

The process for normal operation 90 of these devices 10 is illustrated in the flow chart in FIG. 11. Under normal operation, where a family 14 of devices 10 has been created, tested and configured, as shown at box 92, a pair of configured devices would accept network traffic from their respective local networks or local computer or computers for secure transmission, as shown at box 94. A device 10 that has accepted local network traffic 92 to send begins by encrypting the data using a designated algorithm with its current set of keys, as shown at box 96. The sending device 10 transmits the data across a network, as shown at box 98, to a paired device 10. The sending device can record the encrypted data on local storage, as seen at box 98. The receiving device 10 accepts the encrypted data payload and can record the encrypted data for archival on local storage, as shown at box 100. The receiving device 10 then decrypts the data using the designated algorithm and the pre-shared communication keys, as shown at box 102. After the data has been successfully decrypted, the receiving device transmits the data to its local network 102.

Figure 12:
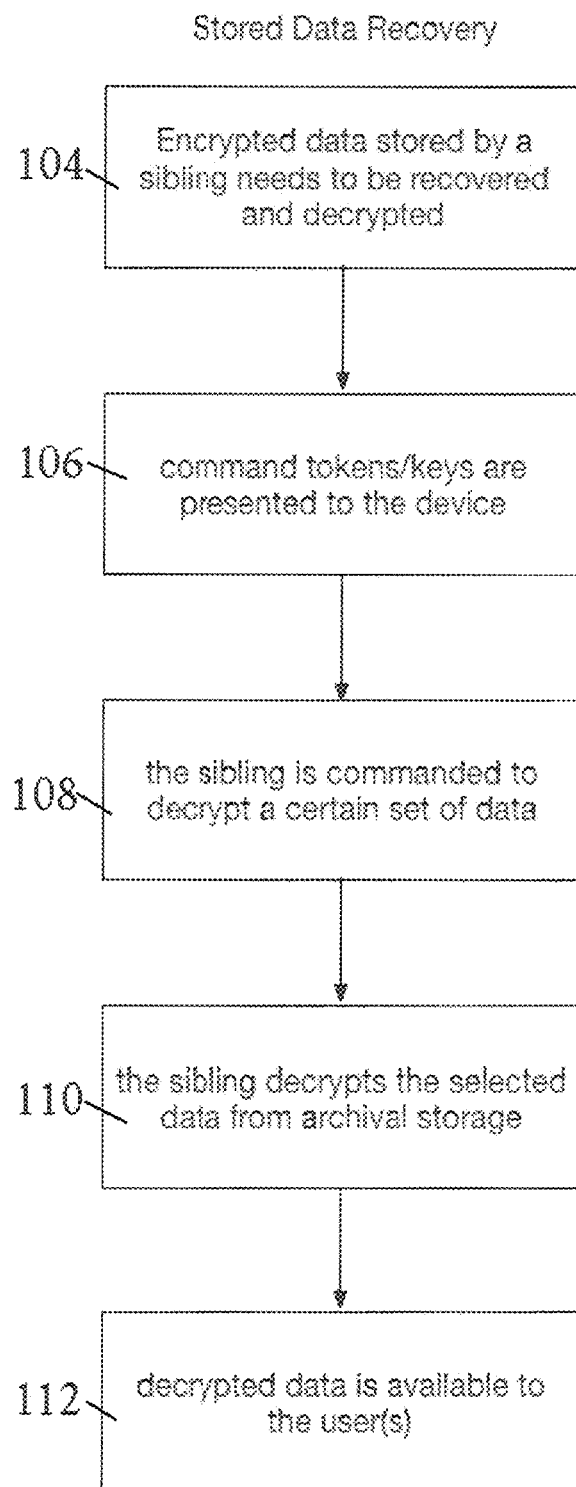
FIG. 12 illustrates a sequential flow chart of the process for recovering stored data on the device.

Encrypted data transmitted between a pair of configured devices may be stored locally on an external storage unit for later retrieval and decryption by a device, as seen in the sequential flow chart in FIG. 12. Should this data need to be recovered, as shown at box 104, the device 10 will require that the command token be presented to the device, as shown at box 106, before it will perform the decryption of the archived data 108. After the command tokens have been properly presented, the device then decrypts the selected archived data, as shown at box 110, from storage and presents it to the user, as shown at box 112.

Figure 13:
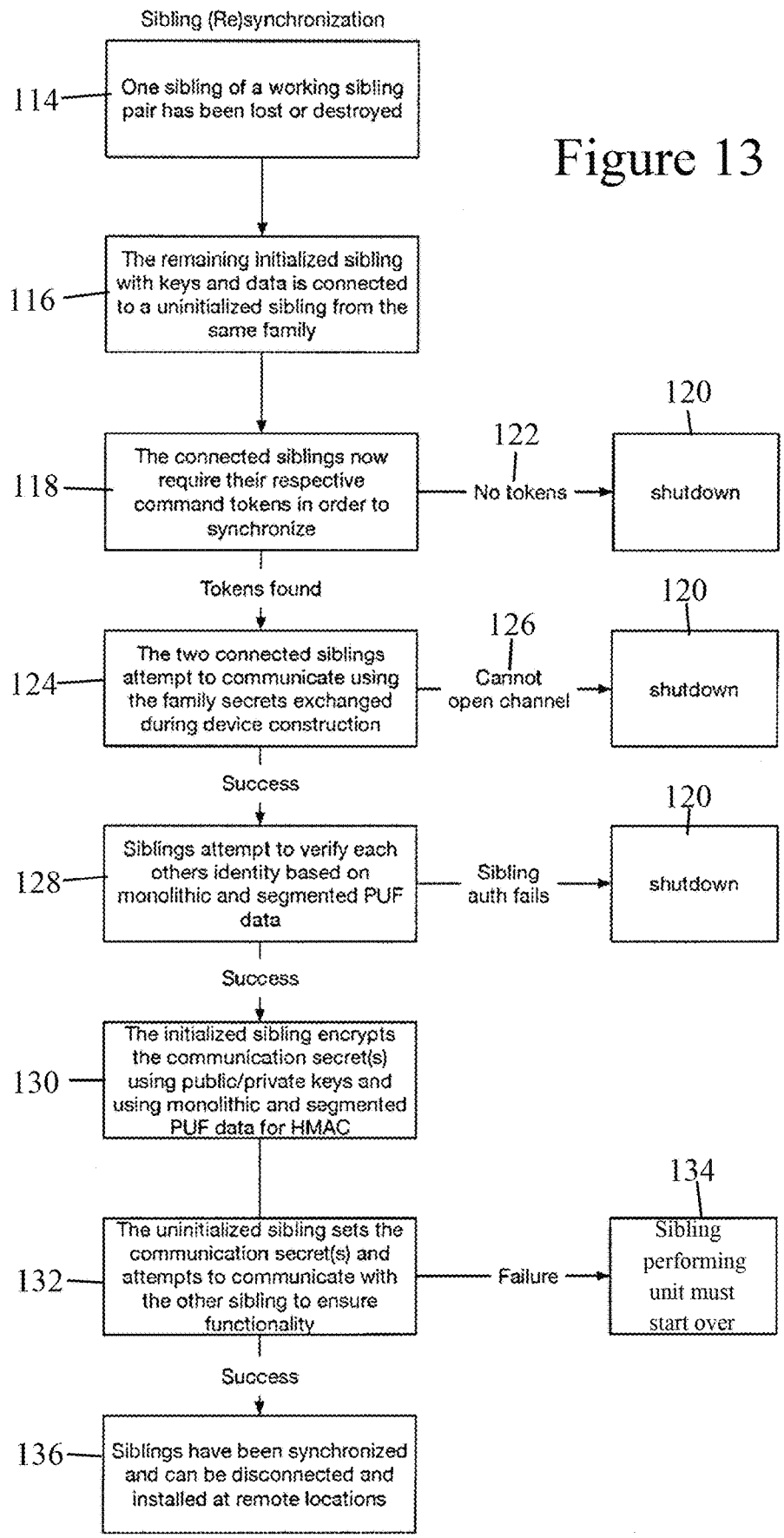
FIG. 13 illustrates a sequential flow chart of the process for resynchronizing the devices.

As seen in the sequential flow chart in FIG. 13, the devices 10 are designed such that if a member of a device pair is lost, destroyed or no longer functional, as seen at box 114, the remaining functional device can be securely resynchronized with another device from the same family 14. The remaining device 10, with keys and data, is connected to another uninitialized member of the same family, as seen at box 116. The devices 10 require that the appropriate command tokens be presented in order to synchronize with each other, as seen at box 118. If no tokens or incorrect tokens 122 are provided, the devices 10 will shut down, as seen at box 120. If the proper command tokens are presented, the devices will attempt to communicate with each other using family keys exchanged during the device construction process, as seen at box 124. If the devices 10 cannot open a channel 126 with each other, both devices will shut down 120. Once the devices have established secure communications with each other, they then verify each other using the challenge-responses created using the PUF data previously exchanged, as seen at box 128. Once the devices 10 have successfully identified and authorized the other's identity appropriately, the initialized device encrypts the communication secrets using public-private keys and using monolithic and segmented PUF data for HMAC 130. Otherwise, the devices 10 will shutdown 120. The uninitialized device sets the communication secrets and attempts to communicate with the initialized device to ensure functionality, as seen at box 132. If the devices fail this process, the initialization process must start over, as seen at box 134. However, if successful, then the siblings have been synchronized and can be installed at remote locations, as seen at box 136.

The present invention provides a system which enables and is suitable for securely transmitting data from one computer or network to another. The present invention increases security of a connection between machines over an insecure medium, such as the internet.

Whereas, the invention has been described in relation to the drawings attached hereto, it should be understood that other and further modifications, apart from those shown or suggested herein, may be made within the scope of this invention.

What is claimed is:

1. A method for creating devices facilitating secure data transmission, storage and key management, the method comprising:
providing a plurality of integrated circuit devices, including a first device and a second device, where each of said devices is comprised of at least part of a physically unclonable function unit originally shared by said plurality of devices on a single, monolithic original integrated circuit;
initializing said plurality of devices in a first initialization;
exchanging at least one key between the first device and the second device;
physically segmenting the shared physically unclonable function unit between said plurality of devices;
initializing each of said segmented plurality of devices in a second initialization; and
physically separating said plurality of devices which share the single, monolithic integrated circuit into individual device units.

2. The method for creating devices of claim 1 wherein the step of initializing said plurality of devices in a first initialization further comprises the steps of:
determining whether the plurality of devices have been previously initialized;
generating at least one key where the key is exchanged between at least two of the devices;
establishing that the devices have not been altered;
exchanging authentication codes between the devices; and
destroying at least one boot fuse connecting at least one of the devices to the single original integrated circuit.

3. The method for creating devices of claim 1 wherein the step of exchanging at least one key between the first device and the second device further comprises exchanging challenge response pairs between the first and second devices.

4. The method of claim 1 wherein the step of initializing each of said plurality of segmented devices in a second initialization further comprises the steps of:
determining whether the plurality of devices have intact secondary boot fuses;
exchanging of the key generated in the first initialization between the devices; and
destroying the secondary boot fuses of the devices.

5. The method of claim 1 wherein the step of physically separating said plurality of devices into individual device units further comprises the steps of:
separating the single, monolithic integrated circuit so each device contains at least part of the physically unclonable function unit;
verifying that each device is properly functioning;
packaging each device; and
destroying the testing fuses on each device.

6. The method of claim 1 wherein each of said plurality of devices includes:
at least one external networking and communications stack;
at least one real time clock;
at least one hardware random number generator; and
at least one cryptography accelerator.

* * * * *